US008576265B2

(12) United States Patent
Tamaru et al.

(10) Patent No.: US 8,576,265 B2
(45) Date of Patent: Nov. 5, 2013

(54) IMAGE FORMING APPARATUS HAVING A PRINTHEAD GUIDE AND LOCKING MECHANISM

(75) Inventors: Yasuo Tamaru, Nagoya (JP); Takuya Yamaguchi, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 762 days.

(21) Appl. No.: 12/507,335

(22) Filed: Jul. 22, 2009

(65) Prior Publication Data

US 2010/0020155 A1 Jan. 28, 2010

(30) Foreign Application Priority Data

Jul. 25, 2008 (JP) ................................ 2008-191670

(51) Int. Cl.

| | |
|---|---|
| ***B41J 2/385*** | (2006.01) |
| ***G03G 13/04*** | (2006.01) |
| *B41J 2/41* | (2006.01) |
| *B41J 2/45* | (2006.01) |
| *B41J 15/14* | (2006.01) |
| *B41J 27/00* | (2006.01) |
| *B41J 2/435* | (2006.01) |
| *B41J 2/47* | (2006.01) |
| *G03G 15/00* | (2006.01) |
| *G01D 15/28* | (2006.01) |
| *G01D 15/06* | (2006.01) |

(52) U.S. Cl.

USPC ........... 347/138; 347/129; 347/238; 347/242; 347/245; 347/257; 347/263; 347/152; 347/170

(58) Field of Classification Search

USPC .................. 347/238, 263, 129–138; 439/350

See application file for complete search history.

(56) References Cited

U.S. PATENT DOCUMENTS 4,258,372 A * 3/1981 Ishikawa ....................... 347/149
5,089,846 A * 2/1992 Tabuchi ....................... 399/167

(Continued)

FOREIGN PATENT DOCUMENTS

JP 58-217378 12/1983
JP 8-101623 4/1996

(Continued)

OTHER PUBLICATIONS

Japanese Official Action dated Nov. 2, 2010 together with an English language translation.
Partial English translation of JP 2000-181165.
Japanese Official Action dated Jul. 27, 2010 together with an English language translation.

*Primary Examiner* — Laura Martin
*Assistant Examiner* — Jeremy Bishop
(74) *Attorney, Agent, or Firm* — Scully, Scott, Murphy & Presser PC

(57) ABSTRACT

An image forming apparatus includes a photoreceptor which is rotatable with respect to a body frame, an exposing member which is movable relative to the body frame, a spacing member which is provided between the exposing member and the photoreceptor to maintain a distance between the photoreceptor and the exposing member, a positioning member which makes a contact with the exposing member to position the exposing member in a direction of rotation of the photoreceptor, and a pressing member which is provided to the body frame to press the exposing member toward the photoreceptor and the positioning member. Accordingly, it is possible to position the exposing member accurately with respect to the photoreceptor, in any of the light-axis direction and the rotational direction of the photoreceptor.

41 Claims, 5 Drawing Sheets

(56) References Cited

U.S. PATENT DOCUMENTS

| | | | | |
|---|---|---|---|---|
| 6,252,619 | B1 | 6/2001 | Ueda et al. | |
| 6,779,875 | B2 * | 8/2004 | Pawlowski et al. | 347/50 |
| 6,995,782 | B2 * | 2/2006 | Oda et al. | 347/138 |
| 7,245,313 | B2 * | 7/2007 | Yamagata | 347/242 |
| 7,565,093 | B2 * | 7/2009 | Okabe et al. | 399/111 |
| 7,649,543 | B2 * | 1/2010 | Tanabe | 347/242 |
| 2008/0069587 | A1 * | 3/2008 | Keefe et al. | 399/115 |
| 2008/0292359 | A1 * | 11/2008 | Yamaguchi | 399/177 |
| 2009/0116875 | A1 * | 5/2009 | Sugiyama et al. | 399/177 |
| 2009/0162091 | A1 * | 6/2009 | Yokoi | 399/90 |
| 2009/0169249 | A1 * | 7/2009 | Watanabe et al. | 399/114 |

FOREIGN PATENT DOCUMENTS

| | | |
|---|---|---|
| JP | 8-318661 | 12/1996 |
| JP | 2000-181165 | 6/2000 |
| JP | 2002-225339 | 8/2002 |
| JP | 2005-014497 | 1/2005 |
| JP | 2005-55781 | 3/2005 |
| JP | 2006-263985 | 10/2006 |
| JP | 2008-183858 A | 8/2008 |

* cited by examiner

IMAGE FORMING APPARATUS HAVING A PRINTHEAD GUIDE AND LOCKING MECHANISM

CROSS REFERENCE TO RELATED APPLICATION

The present application claims priority from Japanese Patent Application No. 2008-191670, which was filed on Jul. 25, 2008, the disclosure of which is herein incorporated by reference in its entirety.

BACKGROUND OF THE INVENTION

1. Field of the Invention

The present invention relates to an image forming apparatus including an exposing member with a plurality of blinking portions which exposes a photosensitive body.

2. Description of the Related Art

For instance, an image forming apparatus which includes a photosensitive drum, an LED head having a plurality of LEDs for exposing the photosensitive drum, and an upper cover which swingably supports the LED head via a spring in vertical direction, with respect to the body of the apparatus has hitherto been known. In this case, a fitting projection which projects downwards is formed on a lower surface of the LED head which is pressed downwards by the spring, and a positioning hole which is not a through hole is formed in a cartridge which supports the photosensitive drum. By fitting the fitting projection into an inner surface of the positioning hole, the LED head is positioned with respect to the photosensitive drum.

SUMMARY OF THE INVENTION

However, in the conventional technology, a front end of the fitting projection is not in contact with a bottom surface of the positioning hole. Therefore, even though it is possible to position the LED head in a rotational direction of the photosensitive drum (a direction of movement of a photosensitive body at a position at which light is incident on the photosensitive drum), it has not been possible to position accurately in a light axis direction of light which is emitted from the LED head.

Therefore, an object of the present invention is to provide an image forming apparatus in which, it is possible to position the LED head (exposure unit, exposure device) accurately with respect to the photosensitive drum in any one of the light axis direction and the rotational direction of the photosensitive drum (photoreceptor, photosensitive body).

According to a first aspect of the present invention, there is provided an image forming apparatus including a body frame;

a photoreceptor which is arranged to the body frame to be rotatable around a predetermined rotational axis;

an exposing member which exposes the photoreceptor and which is movable relative to the body frame, the exposing member having a plurality of blinking portions aligned parallel to the rotational axis of the photoreceptor;

a spacing member which is provided between the exposing member and the photoreceptor to maintain a distance between the photoreceptor and the exposing member;

a positioning member which is brought into contact with the exposing member to position the exposing member in a rotational direction of the photoreceptor; and a pressing member which is provided on the body frame to press the exposing member toward both of the photoreceptor and the positioning member.

In the present application, the wording ‘a direction of a rotational axis of a photoreceptor’ means as follows. When the photoreceptor is a photosensitive drum, the wording means an axial direction of the photosensitive drum. When the photoreceptor is formed by a belt and a supporting shaft which rotatably supports the belt, the wording means an axial direction of the supporting shaft. Moreover, ‘the rotational direction of the photoreceptor’ means a direction of movement of a region of the photoreceptor at which the light is incident.

According to the present invention, the exposing member makes a contact with the positioning member and is positioned accurately in the rotational direction of the photoreceptor by being pressed by the pressing member toward the positioning member. Moreover, the exposing member makes a contact with the photoreceptor via the spacing member, and is positioned accurately in the direction of the light axis (in the optical-axis direction) by being pressed by the pressing member toward the photoreceptor.

According to the present invention, since the exposing member pressed by the pressing member makes a contact with the positioning member and also makes a contact with the photoreceptor via the spacing member, it is possible to position the exposing member accurately with respect to the photoreceptor in any of the rotational direction of the photoreceptor and the light-axis direction.

DETAILED DESCRIPTION OF THE PREFERRED EMBODIMENTS

An embodiment of the present invention will be described below in detail with reference to the accompanying diagrams. In the following description, after describing the overall structure of the color printer, details of the features of the present invention will be described.

Figure 1:
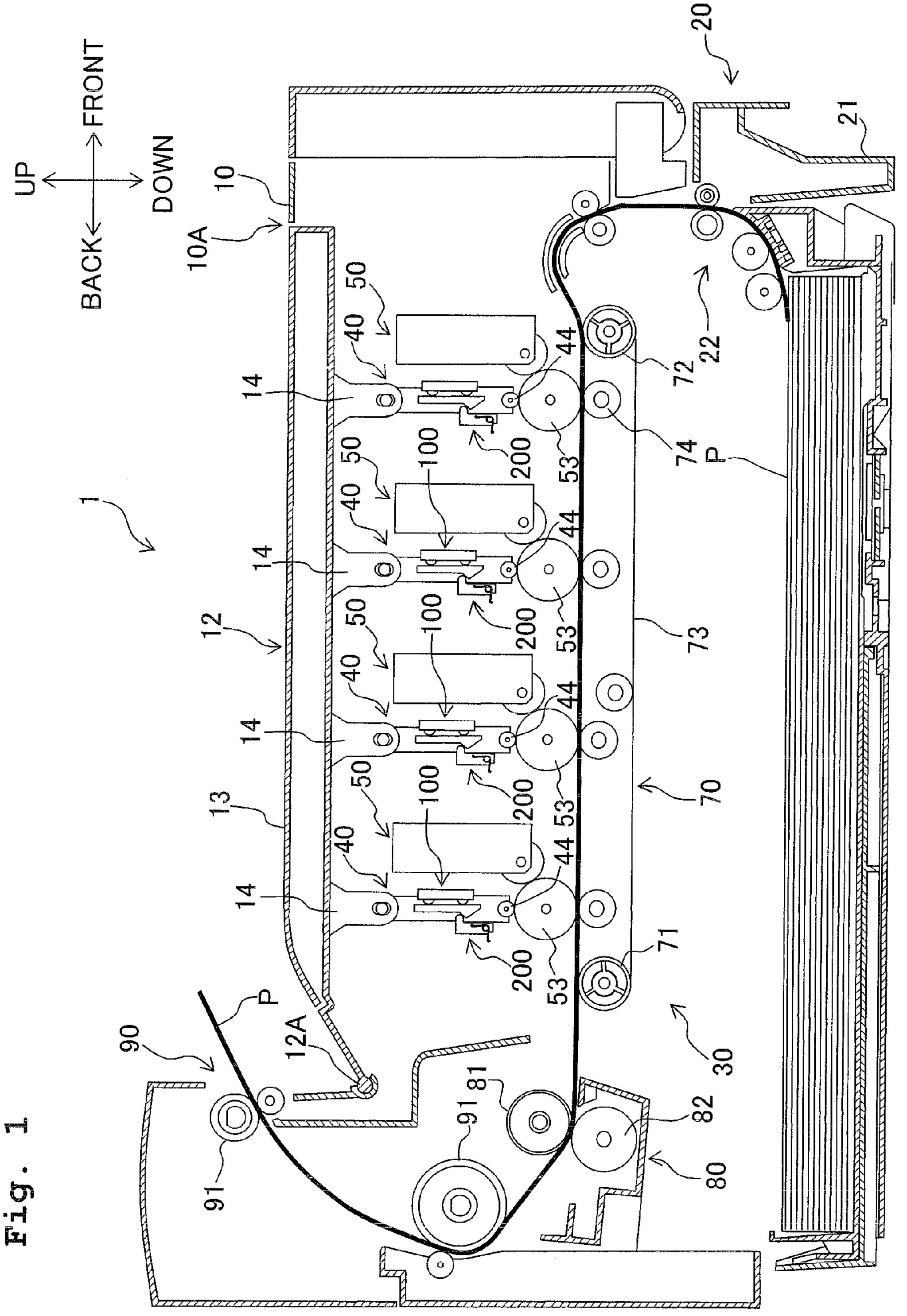
FIG. 1 is a cross-sectional view showing an overall structure of a color printer as an example of an image forming apparatus.

In the following description, directions are determined by referring to a user at the time of using the color printer. In other words, in FIG. 1, a right side and a left side in FIG. 1 are defined to be a ‘front side (frontward)’ and a ‘rear side (rearward)’ respectively, and a rearward and a frontward in a direction perpendicular to the paper surface are defined to be a ‘right side’ and a ‘left side’ respectively. Moreover, an upward direction and a downward direction in FIG. 1 are defined to be an ‘upward direction’ and a ‘downward direction’.

As shown in FIG. 1, a color printer 1 includes a body frame 10, a paper feeding section 20 which supplies a paper P, an image forming section 30 which forms an image on the paper P, and a paper discharge section 90 which discharges the paper P with an image formed thereon, the paper feeding section 20, the image forming section 30 and the paper discharge section 90 being accommodated in the body frame 10.

An opening portion 10A is formed at an upper side of the body frame 10, and an upper cover 12 which covers the opening portion 10A is provided at the upper side of the body frame 10. The upper cover 12 rotates in up-down direction around a hinge 12A as a supporting point which is provided at a rear side of the opening portion 10A to open the opening portion 10A. An upper surface of the upper cover 12 is a paper discharge tray 13 on which papers P discharged from the body frame 10 are stacked, and a plurality of LED attaching members 14 which support the LED unit 40 relatively movably in the vertical direction, which will be described later, is provided on a lower surface of the upper cover 12.

The paper feeding section 20 includes mainly a paper feeding tray 21 which is detachably mounted from the body frame 10 at a lower portion thereof, and a paper supplying mechanism 22 which transports the paper P from the paper feeding tray 21 to the image forming section 30. In the paper feeding section 20, the papers P in the paper feeding tray 21 are separated one-by-one by the paper supplying mechanism 22, and are supplied to the image forming section 30.

The image forming section 30 includes mainly four LED units 40 as exposure units, four process cartridges 50, a transcription unit 70, and a fixing unit 80.

The LED unit 40 is movably supported by the LED attaching member 14 relatively in the vertical direction (up-down direction), and is relatively movable vertically with respect to the upper cover 12 and the body frame 10. Moreover, a pressing member 200 and a positioning member 100 located to the body frame 10 are provided around the LED unit 40. A detail structure of the LED unit 40 and other members around the LED unit 40 will be described later.

The plurality of process cartridges 50 is arranged to be aligned in a front-rear direction (in an anteroposterior direction). Each of the process cartridges 50 includes a photosensitive drum 53 as a photoreceptor which is arranged between the upper cover 12 and the paper feeding section 20 and which is rotatable with respect to the body frame, a charging device which is not shown in the diagram, and other known components such as a developing roller and a toner chamber (toner receptacle).

Each of the transfer unit 70 is provided between the paper feeding section 20 and one of the process cartridges 50, and includes mainly a drive roller 71, a driven roller 72, a transporting belt 73, and a transfer roller 74.

The drive roller 71 and the driven roller 72 are arranged in parallel to be separated in the front-rear direction, and the transporting belt 73 which is an endless belt is put around the drive roller 71 and the driven roller 72. An outer surface of the transporting belt 73 makes a contact with the photosensitive drums 53. Moreover, four transfer rollers 74 are arranged at an inner side of the transporting belt 73, facing the four photosensitive drums 53 respectively. Each of the transfer rollers 74 pinches the transporting belt 73 between one of the photosensitive drums 53 and one of the transfer rollers 74. A transfer bias with a constant current regulation is applied to the transfer roller 74 at the time of transfer (transferring).

The fixing unit 80 is arranged at an inner side (rear side) of each process cartridge 50 and the transfer unit 70, and includes a heating roller 81 and a pressurizing roller 82 which is arranged facing the heating roller 81 to press against the heating roller 81.

In the image forming section 30, firstly, a surface of each of the photosensitive drums 53 is charged uniformly by the charging device, and then exposed by one of the LED units 40. Accordingly, an electric potential of a portion which is exposed lowers, and an electrostatic latent image based on image data is formed on each of the photosensitive drums 53. Thereafter, the toner is supplied onto the electrostatic latent image by the developing roller, the toner image is formed on the photosensitive drums 53.

Next, when the recording paper P which is transported onto the transporting belt 73 is passed between one of the photosensitive drums 53 and one of the transfer rollers 74, the toner image formed on the one of the photosensitive drums 53 is transferred onto the paper P. Moreover, when the paper P is passed between the heating roller 81 and the pressurizing roller 82, the toner image transferred onto the paper P is fixed by heating.

The paper discharge section 90 includes mainly, a plurality of pairs of transporting rollers 91 which transport the paper P. The papers P onto which the toner image is transferred and fixed thermally are transported by the transporting rollers 91 to be discharged to an outside of the body frame 10, and are stacked on the paper discharge tray 13.

<Structure of LED Unit and Other Units Around the LED Unit>

Next, the structure of the LED unit and other units around thereof which is the technical feature of the present invention will be described below in detail.

Figure 2:
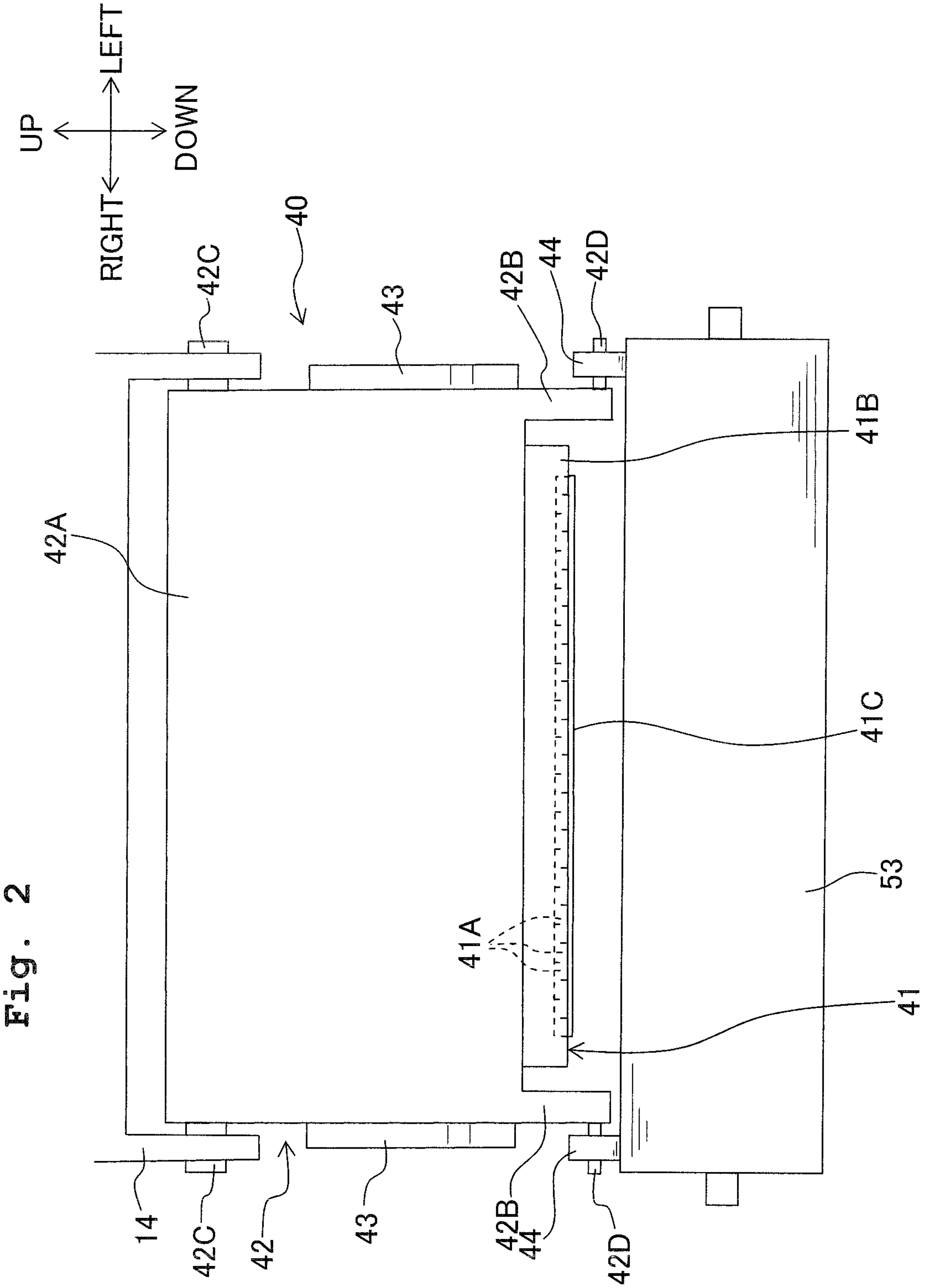
FIG. 2 is a rear view showing a structure of an LED unit and other units around the LED unit.

As shown in FIG. 2, the LED unit 40 includes mainly, an LED head 41, a supporting frame 42, and two contact members 43.

The LED head 41 includes a plurality of light emission diodes (LEDs) 41A, a head frame 41B, and a lens array 41C. In the embodiment, the lens array 41C and the plurality of LEDs 41A correspond to the blinking portion of the present invention. However, this is just an example, and the blinking portion of the present invention is not restricted to the combination of the lens array 41C and the plurality of LEDs 41A.

The LEDs 41A are arranged in a row according to a predetermined pixel pitch in a left-right direction (an axial direction of the photosensitive drums 53). The LEDs 41A can be driven selectively, and the selected LEDs 41A irradiate light toward the photosensitive drums 53. Concretely, when a signal, based on data of an image to be formed, is input by a control unit not shown in the diagram, each of the LEDs 41A emits the light to expose the photosensitive drums 53.

The head frame 41B is formed of a resin material, and a lower portion thereof supports the LEDs 41A. Since the head frame 41B is formed of a resin, there is a reduction in a size and a cost of the LED head 41, and an electrical discharge from high-voltage components such as a charging device is suppressed.

Lens array 41C is an integrated optical component in which a plurality of circular cylindrical lenses each having a refractive-index distribution is arranged in a row or in a plurality of rows, and the lens array 41C is capable of achieving a magnified erect image. Furthermore, the lens array 41C is fixed to the head frame 41B.

The supporting frame 42 supports the LED head 41, and includes a base portion 42A extended in a left-right direction beyond the LED head 41, and a pair of extended portions 42B extended downwards from both ends of the base potion 42A.

The LED head 41 is fixed to a lower surface of the base portion 42A (at a portion between the pair of extended portions 42B). Moreover, a pair of pins 42C, which are slidably engaged with a pair of slotted holes 14A (refer to FIG. 3) formed on left and right sides of a forked LED fitting member 14, is provided at an upper portion of both left and right side-surfaces of the base portion 42A.

Furthermore, the contact member 43 which will be described later is provided at a central portion of both left and right side-surfaces of the base portion 42A. The contact member 43 may be a component separate from the supporting frame 42 or may be formed integrally with the supporting frame 42.

The extended portion 42B projects downwards from a lower surface of the LED head 41 supported by the base portion 42A, and a pair of shafts 42D is provided at a lower-end portion thereof. Moreover, a pair of guide rollers 44 as an example of a spacing member (a distance maintaining member) is rotatably provided to the pair of shafts 42D.

The guide roller 44 has a circular cylindrical shape, and rotates by being driven by the photosensitive drum 53 while making a contact with the photosensitive drum 53. Moreover, a distance, in the light-axis direction, between the photosensitive drum 53 and the LED head 42 supported by the supporting frame 42 is maintained because the guide roller 44 makes a contact with the photosensitive drum 53.

Figure 3:
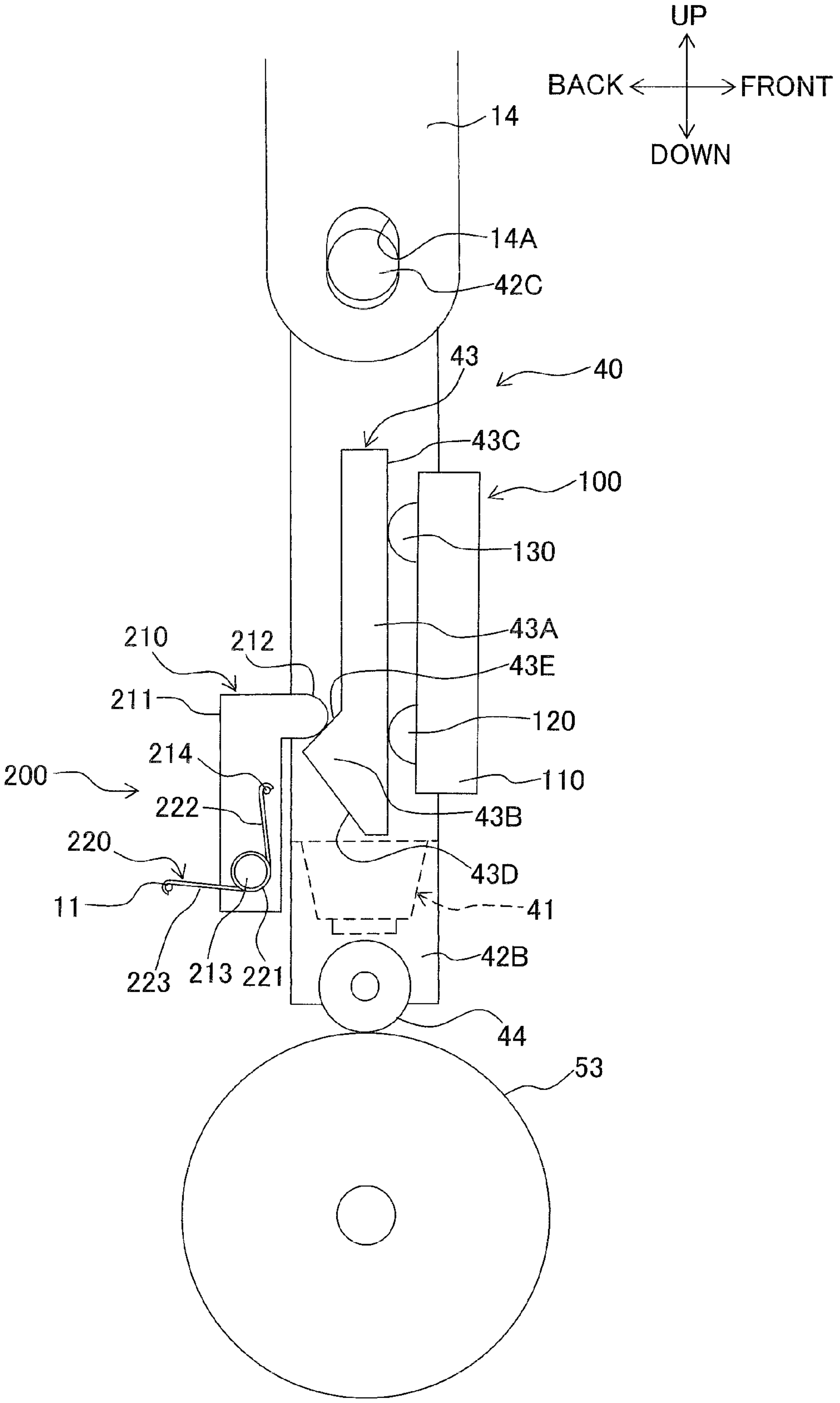
FIG. 3 is a side view showing a structure of the LED unit and the other units around the LED unit.

As shown in FIG. 3, the contact member 43 includes a plate-shaped base portion 43A extended vertically, and a chevron-shaped projection 43B which is projected rearward (toward a pressing member 200 which will be described later) from a lower portion of the base portion 43A.

A front surface 43C of the base portion 43 is formed to be a plane-surface shaped, and makes a contact with a positioning member 100 which will be described later.

A first inclined surface 43D which is inclined rearward in an upward direction, and a second inclined surface 43E which is inclined frontward in an upward direction from an upper end of the first inclined surface 43D are formed on the projection 43B. Moreover, the projection 43B is arranged at a position such that, when the LED unit 40 is positioned at an exposing position (position shown in FIGS. 2 and 3) of exposing the photosensitive drum 53, the second inclined surface 43E is pressed by the pressing member 200 which will be described later.

The contact member 43 is sandwiched by the positioning member 100 and the pressing member 200, in a front-rear direction. Concretely, corresponding to the pair of contact members 43 located at left and right sides of the supporting frame 42, respectively, a pair set of the positioning member 100 and the pressing member 200 is arranged at left and right sides of the supporting frame 42, respectively. One of the positioning members 100 has a substantially same structure as the other of the positioning members 100, and the same can be said for the pressing members 200. Therefore, one of the positioning members 100 and one of the pressing members 200 at one side will be described below.

The positioning member 100 is arranged at a front side of the contact member 43, and positions, in a front-rear direction (a rotational direction of the photosensitive drum 53), the LED unit 40 which is pressed frontward by the pressing member 200.

The positioning member 100 includes a plate-shaped base portion (base-plate portion) 110 fixed to the body frame 10, a movement limiter portion (first projection) 120 which is formed at a lower side of a rear surface of the base portion 110, and a tilting limiter portion (second projection) 130 which is formed at an upper side of the rear surface of the base potion 110. Another positioning member, which is arranged at an opposite side in a left-right direction of the positioning member 100 shown in the diagram, may include only the movement limiter portion 120 without providing the tilting limiter portion 130. In other words, the LED unit 40 may be supported at three points by two movement limiter portions 120 and one tilting limiter portion 130.

The movement limiter portion 120 is a hemispherical projection projected rearward from a rear surface of the base potion 110, and makes a contact with an area of the front surface 43C, of the contact member 43, near the photosensitive drum 53. Whereas, the tilting limiter portion 130 is a hemispherical projection projected rearward from the rear surface of the base portion 110, and is arranged to overlap with the movement limiter portion 120 when viewed from a vertical direction (upper and lower side). Moreover, the tilting limiter portion 130 makes a contact with an area of the front surface of the contact member 43, away from the photosensitive drum 53, than the area of contact of the movement limiter portion 120.

The pressing member 200 includes a turnable arm 210 and a torsion spring 220.

The turnable arm 210 has a base portion 211 extended in a vertical direction (up-down direction), and a projecting portion 212 projected frontward from an upper portion of the base portion 211. A turning shaft 213 which projects outward in a left-right direction is formed at a lower portion of the base portion 211, and the turning shaft 213 is turnably supported by the body frame 10 (a pair of side frame forming the body frame 10, arranged to be mutually opposite in the left-right direction). Moreover, an engaging shaft 214 which projects outward in the left-right direction is formed at a central portion of the base portion 211.

A front surface (front-end surface) of the projecting portion 212 is formed to be a curved surface, and makes a contact with the second inclined surface 43E of the contact member 43, at the abovementioned exposing position.

The torsion spring 220 has a spring-body portion 221 in the form of a coil, a first arm 222 and a second arm 223 both extended outward from the spring-body portion 221 in a radial direction. Moreover, when the spring-body portion 221 is mounted on the turning shaft 213 of the turnable arm 210, the first arm 222 is engaged with the engaging shaft 214 of the turnable arm 210, and the second arm 223 is engaged with an engaging shaft 11 formed in the body frame 10.

When the projecting portion 212 of the turnable arm 210 is pressed forward by the torsion spring 220, a frontward thrust is exerted to the second inclined surface 43E of the contact member 43. Accordingly, the LED unit 40 is pressed toward the photosensitive drum 53 and the positioning member 100. More concretely, when the second inclined surface 43E of the contact member 43 is pressed forward by the projecting portion 212 of the turnable arm 210, the LED unit 40 makes a contact with the positioning member 100. Furthermore, the LED unit 40 which has made a contact with the positioning member 100 is moved downwards along the positioning member 100 and comes near (closer to) the photosensitive drum 53.

Furthermore, in the embodiment, the LED unit 40 is supported by the upper cover 12. Therefore, the pressing member 200 presses the LED unit 40 in a direction of closing the upper cover 12, at the abovementioned exposing position. In other words, in the embodiment, a locking mechanism of the upper cover 12 is formed by the contact member 43 (projection 43B) and the pressing member 200 of the LED unit 40.

Moreover, the positioning member 100 and the pressing member 200 are provided for all the four LED units 40.

<Action of Contact Member, Positioning Member, and Pressing Member>

Next, an action of the positioning member 100, the pressing member 200, and the contact member 43 of the LED unit 40 will be described below.

Figures 4A, 4B, 4C:
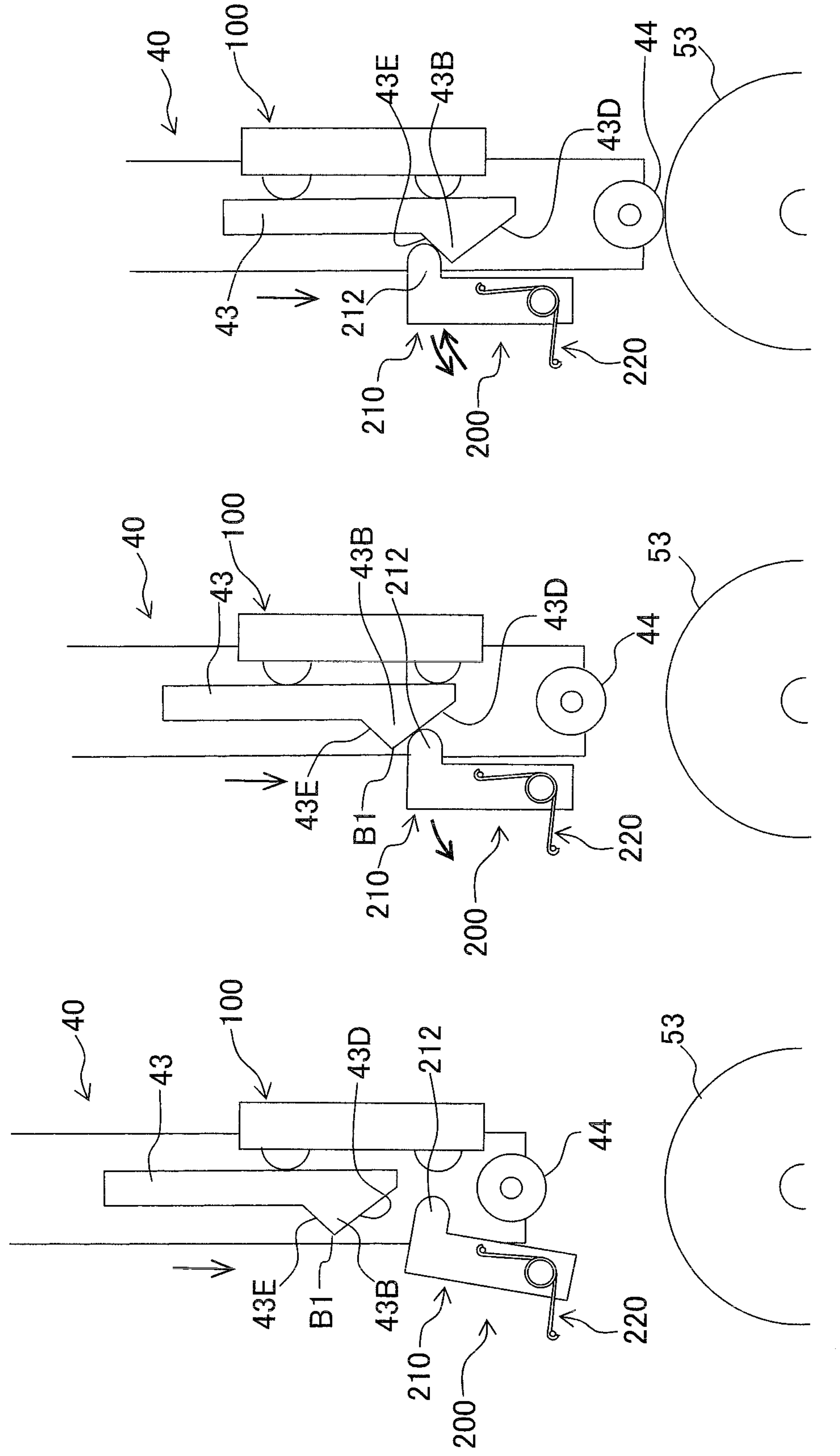
FIG. 4A is a side view showing a state before inserting the LED unit between a positioning member and a pressing member.
FIG. 4B is a side view showing a state when the pressing member is pressed by a projection of the LED unit.
FIG. 4C is a side view showing a state in which the LED unit is arranged at an exposing position.

As shown in FIG. 4A, when the upper cover 12 is closed and the LED unit 40 is lowered toward the exposing position, firstly, the first inclined surface 43D of the projection 43B formed on the contact member 43 of the LED unit 40 makes a contact with the turnable arm 210 of the pressing member 200. Thereafter, when the LED unit 40 is further lowered, the turnable arm 210 is thrust aside rearward by the first inclined surface 43D of the projection 43B as shown in FIG. 4B. Moreover, when the projecting portion 212 presses forward the first inclined surface 43D of the projection 43, the pin portion 42C makes a contact with an upper-end portion defining a part of the slotted hole 14A and is pressed downwards. Since the pin portion 42C is pressed downwards by the upper-end portion defining the slotted hole 14A, the LED unit 40 is pressed downwards assuredly irrespective of the magnitude of the thrust exerted by the pressing member 200.

After the projecting portion 212 of the turnable arm 210 thrust aside by the first inclined surface 43D has crossed an apex portion B1 of the projection 43B, the projecting portion 212 of the turnable arm 210 presses the second inclined surface 43E of the projection 43B by a bias force imparted by the torsion spring 220 as shown in FIG. 4C. Accordingly, the LED unit 40 is pressed toward the photosensitive drum 53 and the positioning member 100, and is positioned favorably at the exposing position, thereby making it possible to carry out favorable image formation. Moreover, the projecting portion 212 presses downwards the second inclined surface 43E of the projection 43B after the projecting portion 212 has crossed (over) the apex portion B1 of the projection 43B. Therefore, even when the thrust is not exerted by the upper cover 12 due to the contact of the pin potion 42C and the slotted hole 14A being released, the LED unit 40 is positioned assuredly at the exposing position.

Here, the photosensitive drum 53 may not be formed to be a perfect circular cylinder having a perfectly circular shaped cross-section due to a manufacturing error or technical limitations. Or, at the time of image formation, when a shaft for rotatably supporting the photosensitive drum 53 is shifted from a regular position, sometimes, the LED unit 40 undergoes reciprocating movement following the surface of the rotating photosensitive drum 53. Even in such a case, since the LED unit 40 is movably supported in the vertical direction relative to the upper cover 12 as it has been described above, a force due to the reciprocating movement of the LED unit 40 is suppressed from being transmitted to the upper cover 12.

Moreover, the upper cover 12 is locked at a predetermined position when the LED unit 40 positioned at the exposing position is pressed in a direction of closing of the upper cover 12 by the pressing member 200. Therefore, the upper cover 12 is maintained in a closed state as long as a force stronger than a predetermined force is not exerted to the upper cover 12 in an upward direction.

Moreover, in a case of making the LED unit 40 retract from the exposing position, opposite to the above description, the pressing member 200, which returns to an initial position after the pressing member 200 is thrust aside by the second inclined surface 43E of the projection 43B, presses the first inclined surface 43D. Then, the LED unit 40 is pressed upward by the first inclined surface 43D. Accordingly, an opening operation of the upper cover 12 is assisted by the bias force imparted by the pressing member 200.

According to the abovementioned description, it is possible to achieve the following effect in (by) the embodiment. The LED unit 40 pressed by the pressing member 200 makes a contact with the positioning member 100, and also makes a contact with the photosensitive drum 53 via the guide roller 44. Therefore, it is possible to position the LED unit 40 accurately with respect to the photosensitive drum 53, in any of the light-axis direction (optical-axis direction) and the rotational direction of the photosensitive drum 53.

Once the pressing member 200 crosses over the apex portion B1 of the projection 43B, the LED unit 40 is pressed to the exposing position by the thrust exerted by the pressing member 200. Therefore, the mounting of the LED unit 40 at the exposing position becomes easy. In other words, in a conventional structure, an LED unit has been supported by the upper cover via a spring, and also a fitting projection formed on a lower surface of the LED unit has been fitted in a recess of a photoreceptor-frame which supports the photosensitive drum. Therefore, when the fitting projection and the recess are mismatched, the positioning is not possible. Whereas, in the embodiment, the pressing member 200 is provided to the body frame 10, and the pressing member 200 is thrust aside by the first inclined surface 43D of the projection 43B. Therefore, even when a position of the projection 43B with respect to the pressing member 200 is somewhat mismatched, it is possible to carry out the positioning easily and accurately by thrusting the pressing member 200 by the first inclined surface 43D.

When the second inclined surface 43E presses the pressing member 200, the LED unit 40 makes a contact with the positioning member 100, and also the LED unit 40 comes closer to the photosensitive drum 53 along the positioning member 100. Therefore, although the thrust of the pressing member 200 is directed to a horizontal direction, it is possible to press the LED unit 40 downwards toward the photosensitive drum 53 by the second inclined surface 43E. Moreover, since the thrust exerted by the pressing member 200 is directed to the horizontal direction, the pressing member 200 becomes susceptible to being thrust aside by the projection 43B, and it is possible to mount the LED unit 40 at the exposing position easily.

Since the LED unit 40 is supported by the upper cover 12, the LED unit 40 can be detached by an opening of the upper cover 12 and can be attached by a closing of the upper cover 12. Moreover, the LED unit 40 is movable relative to the upper cover 12. Therefore, even when the LED unit 40 has undergone reciprocating movement following the movement of the surface of the photosensitive drum 53, it is possible to suppress a load (a reactive force from the photosensitive drum 53) exerted to the upper cover 12 by the reciprocating movement of the LED unit 40.

The projection 43B of the contact member 43 is pressed in a direction of closing the upper cover 12 by the pressing member 200. At this time, since the upper cover 12 is locked at the predetermined position, components such as the projection 43B and the pressing member 200 for the positioning of the LED unit 40 also serve as a locking mechanism for locking the upper cover 12. Therefore, it is not necessary to provide separately a locking mechanism for locking the upper cover 12, apart from the pressing member 200 and the contact member 43, and it is possible to lower the cost.

Since all the four LED units 40 are relatively movably supported by the upper cover 12, it is possible to suppress the reactive force from each of the four photosensitive drums 53 from being transmitted to the upper cover 12. Moreover, since the four folded reactive force is suppressed in such manner, it is possible to lower a stiffness (rigidity) of the upper cover 12, and it is possible to make the upper cover 12 light, and to improve an operability thereof.

When the LED unit 40 is retracted from the exposing position, the first inclined surface 43D is pressed by the pressing member 200. At this time, since the LED unit 40 is pressed upward and the opening/closing operation of the upper cover 12 is assisted by the bias force imparted by the pressing member 200, it is possible to improve the operability.

Since the tilting limiter portion 130 is provided at an upper side of the movement limiter portion 120, it is possible to suppress the tilting (pivoting) of the LED unit 40 with the movement limiter portion 120 as a fulcrum.

The present invention is not restricted to the embodiment described above, and it is possible to use in various embodiments as described below. In the above described embodiment, the pressing member 200 includes the turnable arm 210 and the torsion spring 200. However, the present invention is not restricted to such arrangement, and the pressing member 200 may include a coil spring and a roller which is rotatable with respect to the coil spring, or may include only a wire spring or a plate spring.

Figure 5:
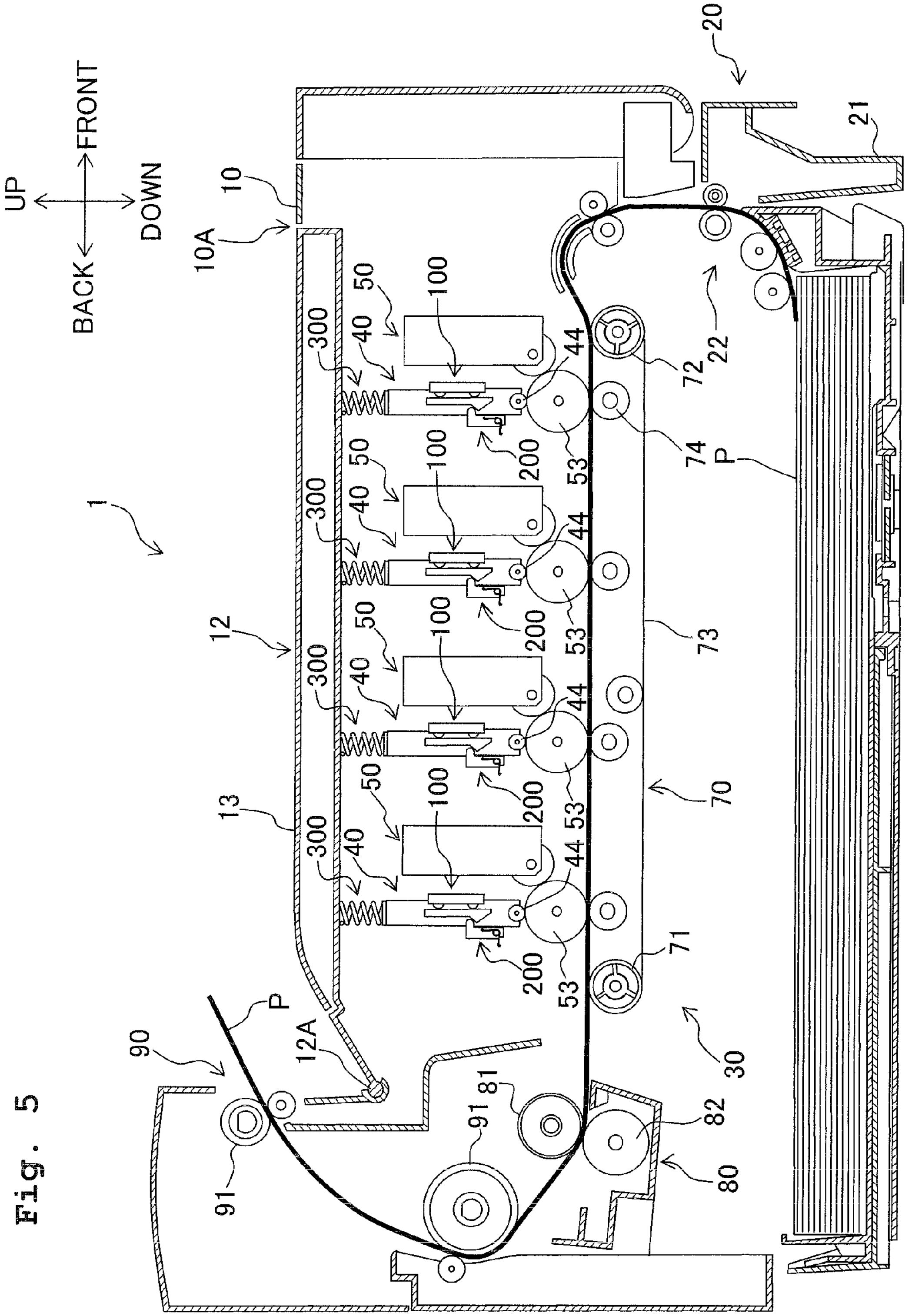
FIG. 5 is a cross-sectional view showing a state in which the LED unit is supported by an upper cover via a coil spring.

In the embodiment described above, the LED unit 40 is relatively movably supported by the upper cover 12 by using the slotted hole 14A and the pin portion 42C. However, the present invention is not restricted to such arrangement. For instance, as shown in FIG. 5, the LED unit 40 may be relatively movably supported by the upper cover 12 via a coil spring 300 in which the thrust exerted by the coil spring 300 is weaker than that exerted by the pressing member 200.

Even in this case, since the spring force of the coil spring 300 is weak, the reactive force from the photosensitive drum 53 is hardly transmitted to the upper cover 12. Therefore, it is possible to suppress a load exerted to the upper cover 12. Moreover, the LED unit 40 may not be supported by the upper cover 12. In this case, it is possible to suppress the load exerted to the upper cover 12 by the reactive force from the photosensitive drum 53.

In the embodiment described above, the locking mechanism of the upper cover 12 includes the projection of the contact member 43 and the pressing member 200. However, the present invention is not restricted to such arrangement, and a separate locking mechanism may be provided to the upper cover 12.

In the embodiment described above, guide rollers 44 which are rotatable are adopted as the spacing member. However, the present invention is not restricted to such arrangement, and a member which does not rotate may be adopted as a spacing member. For example, a spacer having a curved surface in the form of a recess in which the curved surface makes contact with an outer peripheral surface of the photosensitive drum can be adopted as the spacing member. Moreover, the spacing member may be provided between an exposing member and a photoreceptor. For example, the spacing member may be provided to a frame which rotatably supports a photosensitive drum.

In the embodiment described above, the LED head 41 which includes the plurality of LEDs 41A arranged in a single row in the left-direction is adopted as one of the components of the exposing member. However, the present invention is not restricted to such arrangement. For instance, an LED head having a plurality of rows of LEDs lined up in the left-right direction may be used. Moreover, a plurality of blinking portions may be formed by a light emitting element such as an LED or a fluorescent light, and an optical shutter having a plurality of a liquid crystal elements or PLZT elements aligned in the left-right direction. Moreover, a light source is not restricted to an LED, and may be an EL (electro-luminescence) element or a fluorescent body.

In the embodiment described above, the present invention is applied to the color printer 1. However, the present invention is not restricted to be applied to a color printer and may be applied to other image forming apparatuses such as a printer for black and white printing, a copying machine, or a multifunction device.

In the embodiment described above, the photosensitive drum 53 is used as a photoreceptor. However, the present invention is not restricted to the photosensitive drum 53, and a photoreceptor in a form of a belt may be used.

What is claimed is:

1. An image forming apparatus comprising:

a photosensitive drum configured to be rotatable around a predetermined rotational axis;

an exposing member having a plurality of blinking portions aligned parallel to the predetermined rotational axis of the photosensitive drum, the exposing member being configured to expose the photosensitive drum;

a spacing member configured to maintain a constant distance between the photosensitive drum and the exposing member;

a positioning member configured to contact the exposing member at a downstream side of the rotational direction of the photosensitive drum relative to the exposing member; and a pressing member configured to press the exposing member toward both the photosensitive drum and the positioning member, wherein the exposing member is sandwiched in a predetermined direction by the positioning member and a portion of the pressing member in the exposing position, the predetermined direction being substantially horizontal.

2. The image forming apparatus according to claim 1, wherein the exposing member has a chevron-shaped projection which is projected toward the pressing member, the chevron-shaped projection having a first inclined surface and a second inclined surface, the first inclined surface thrusting aside the pressing member when the exposing member moves toward the exposing position at which the exposing member exposes the photosensitive drum, and the second inclined surface being pressed by the pressing member after the pressing member thrust aside by the first inclined surface is moved to cross over an apex portion of the chevron-shaped projection, and wherein when the second inclined surface is pressed by the pressing member, the exposing member contacts with the positioning member, and is positioned substantially proximate to the photosensitive drum.

3. The image forming apparatus according to claim 1, further comprising a cover which movably covers an opening formed in a body frame, wherein the exposing member is supported by the cover such that the exposing member is movable relative to the cover.

4. The image forming apparatus according to claim 1, wherein when the exposing member is located at the exposing position, the pressing member presses the exposing member in a direction of closing the cover.

5. The image forming apparatus according to claim 3, wherein a locking occurs when the cover is in a closed position.

6. The image forming apparatus according to claim 3, further comprising a plurality of sets of photosensitive drums and corresponding exposing members in an one-to-one correspondence, each being arranged in parallel, and each corresponding exposing member is supported by the cover such that the corresponding exposing member is movable relative to the cover.

7. The image forming apparatus according to claim 6, further comprising a plurality of pressing members, each of the plurality of pressing members being in a one-to-one correspondence with the corresponding exposing members in the plurality of sets.

8. The image forming apparatus according to claim 1, wherein the plurality of blinking portions have a plurality of light emitting devices (LEDs) and a plurality of circular cylindrical shaped lenses corresponding to the LEDS respectively.

9. The image forming apparatus according to claim 2, wherein the pressing member includes: a turnable arm having a base portion extended in a first direction, a projection which is projected from one end of the base portion toward the exposing member, and a turning shaft provided at the other end of the base portion, the turnable arm being provided to a body frame such that the turnable arm is turnable around the turning shaft; and a torsion spring having a spring-body portion in a form of a coil, and first and second arms which are extended from the spring-body portion toward an outer side in a radial direction of the coil, and the spring-body portion of the torsion spring is mounted on the turning shaft of the turnable arm, and the first arm is engaged with the base portion of the turnable arm, and the second arm is engaged with the body frame.

10. The image forming apparatus according to claim 9, wherein the positioning member includes:

a base-plate portion which is fixed to the body frame to face the exposing member, and which is extended in the first direction;

a first projection which is formed on a facing surface of the base-plate portion facing the exposing member, at one end of the base-plate portion in the first direction, and contacts with the exposing member at a position at which the first projection faces the turnable arm, with the exposing member being intervened between the first projection and the turnable arm; and a second projection which is formed on the facing surface of the base-plate portion, at the other end in the first direction of the base-plate portion, and which contacts with the exposing member.

11. The image forming apparatus according to claim 1, wherein the positioning member and pressing member are configured to lock the exposing member in an exposing position relative to the photosensitive drum.

12. An image forming apparatus comprising:

a photoreceptor configured to rotate around a predetermined rotational axis;

an exposing member configured to expose the photoreceptor, the exposing member having a plurality of blinking portions aligned parallel to the predetermined rotational axis of the photoreceptor;

a positioning member configured to contact the exposing member at a downstream side of a rotational direction of the photoreceptor relative to the exposing member; and a pressing member configured to press the exposing member toward both the photoreceptor and the positioning member, said pressing induces at least two forces, wherein a first force of the at least two forces is directed in a substantially vertical direction and a second force of the at least two forces is directed in a substantially horizontal direction.

13. The image forming apparatus according to claim 12, wherein the photoreceptor and the exposing member are separated by a constant spacing.

14. The image forming apparatus according to claim 13, wherein the constant spacing is maintained by a spacing member.

15. The image forming apparatus according to claim 12, wherein the exposing member is sandwiched by the positioning member and the pressing member.

16. The image forming apparatus according to claim 15, wherein the exposing member is sandwiched by a portion of the pressing member that contacts the exposing member.

17. The image forming apparatus according to claim 12, wherein the pressing member has a projection portion configured to contact the exposing member.

18. The image forming apparatus according to claim 17, wherein the projection portion projects in a direction towards the exposing member.

19. The image forming apparatus according to claim 18, wherein a surface of the projection portion is curved.

20. The image forming apparatus according to claim 12, wherein the pressing member comprises a spring.

21. The image forming apparatus according to claim 12, wherein the exposing member comprises:

a plurality of light emitting diodes (LEDs);

a lens array; and a head frame configured to support the LEDs and lens array, the head frame being formed with a resin material.

22. The image forming apparatus according to claim 20, wherein the spring is a plate spring.

23. The image forming apparatus according to claim 12, further comprising a frame, the photoreceptor being arranged to the frame, and the pressing member being provided on the frame.

24. The image forming apparatus according to claim 23, further comprising a process cartridge that includes the photoreceptor, and the frame is a main body frame that is configured to accommodate the processing cartridge.

25. The image forming apparatus according to claim 14, wherein the spacing member is configured to contact a surface of the photoreceptor.

26. The image forming apparatus according to claim 18, wherein the projection is configured to press the exposing member toward both the photoreceptor and the positioning member.

27. The image forming apparatus according to claim 12, wherein the exposing member has a light emitting diode (LED) head, a supporting frame configured to support the LED head, and the pressing member is configured to press the supporting frame.

28. The image forming apparatus according to claim 14, where the spacing member is separate from the positioning member.

29. The image forming apparatus according to claim 12, wherein the positioning member and pressing member are configured to lock the exposing member in an exposing position relative to the photoreceptor.

30. The image forming apparatus according to claim 1, wherein the pressing member includes a turnable arm that is configured to contact with the exposing member.

31. The image forming apparatus according to claim 1, wherein the predetermined direction is horizontal.

32. The image forming apparatus according to claim 12, wherein a first force of the at least two forces is directed in a vertical direction and a second force of the at least two forces is directed in a horizontal direction.

33. An image forming apparatus comprising:

a photosensitive drum configured to be rotatable around a predetermined rotational axis;

an exposing member having a plurality of blinking portions aligned parallel to the predetermined rotational axis of the photosensitive drum, the exposing member being configured to expose the photosensitive drum;

a spacing member configured to maintain a constant distance between the photosensitive drum and the exposing member;

a positioning member substantially parallel to an optical axis of the exposing member configured to contact the exposing member at a downstream side of the rotational direction of the photosensitive drum relative to the exposing member; and a pressing member configured to press the exposing member toward the photosensitive drum and into a substantially vertical surface of the positioning member.

34. The image forming apparatus according to claim 33, wherein the exposing member is pressed in two different directions.

35. The image forming apparatus according to claim 1, wherein the predetermined direction is perpendicular to the predetermined rotational axis of the photosensitive drum and an optical axis of the exposing member.

36. The image forming apparatus according to claim 35, wherein a portion of the exposing member contacting the portion of the pressing member is a flat surface of the exposing member, and a portion of the exposing member contacting the portion of the positioning member is a flat surface of the exposing member.

37. The image forming apparatus according to claim 12, wherein the exposing member is sandwiched by a portion of the pressing member and the positioning member in a predetermined direction, the predetermined direction being perpendicular to the predetermined rotational axis of the photoreceptor and an optical axis of the exposing member.

38. The image forming apparatus according to claim 37, wherein a portion of the exposing member contacting the portion of the pressing member is a flat surface of the exposing member, and a portion of the exposing member contacting the portion of the positioning member is a flat surface of the exposing member.

39. The image forming apparatus according to claim 33, wherein the exposing member is sandwiched by a portion of the pressing member and the positioning member in a predetermined direction, the predetermined direction being perpendicular to the predetermined rotational axis of the photoreceptor and the optical axis of the exposing member.

40. The image forming apparatus according to claim 39, wherein a portion of the exposing member contacting the portion of the pressing member is a flat surface of the exposing member, and a portion of the exposing member contacting the portion of the positioning member is a flat surface of the exposing member.

41. The image forming apparatus according to claim 37, wherein the second force is directed in a direction perpendicular to the predetermined rotational axis of the photoreceptor and the optical axis of the exposing member.

* * * * *